US012536736B2

(12) United States Patent
Sun et al.

(10) Patent No.: US 12,536,736 B2
(45) Date of Patent: Jan. 27, 2026

(54) 3D REPRESENTATION OF PHYSICAL ENVIRONMENT OBJECTS

(71) Applicant: Apple Inc., Cupertino, CA (US)

(72) Inventors: Boyuan Sun, Beijing (CN); Bin Liu, Beijing (CN); Feng Tang, Cupertino, CA (US); Peng Wu, Campbell, CA (US); Ye Cong, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 391 days.

(21) Appl. No.: 18/119,792

(22) Filed: Mar. 9, 2023

(65) Prior Publication Data

US 2023/0289993 A1   Sep. 14, 2023

Related U.S. Application Data

(60) Provisional application No. 63/318,861, filed on Mar. 11, 2022.

(51) Int. Cl.
*G06T 17/00* (2006.01)
*G06T 7/11* (2017.01)
(Continued)

(52) U.S. Cl.
CPC ............. *G06T 17/00* (2013.01); *G06T 7/11* (2017.01); *G06T 7/62* (2017.01); *G06T 19/00* (2013.01);
(Continued)

(58) Field of Classification Search
None
See application file for complete search history.

(56) References Cited

U.S. PATENT DOCUMENTS 10,657,712 B2 * 5/2020 Sheffield ............ G06V 10/7715
10,853,974 B2   12/2020 Budagavi et al.

FOREIGN PATENT DOCUMENTS

WO   WO 2013155217   10/2013
WO   WO 2021136877   7/2021
WO   WO-2022005850 A1 *  1/2022 ........... A63F 13/213

OTHER PUBLICATIONS

Haoqiang Fan, Hao Su, Leonidas J. Guibas, "A Point Set Generation Network for 3D Object Reconstruction From a Single Image", 2017, Proceedings of the IEEE Conference on Computer Vision and Pattern Recognition (CVPR), pp. 605-613 (Year: 2017).*
(Continued)

*Primary Examiner* — Michael J Cobb
(74) *Attorney, Agent, or Firm* — Thompson Hine LLP (57) ABSTRACT

Various implementations provide 3D representations of objects. Such representations may be based on 3D point cloud and/or 2D image inputs that are obtained based on sensor data, e.g., images, depth data, motion data, etc. 3D point cloud input may be used for part segmentation and/or to determine position and/or orientation of object parts, e.g., generating 3D bounding boxes representing the sizes, positions, and orientations, of object parts. 2D image input may be used for part attribute recognition, e.g., to determine whether a chair legs part has a particular type such as star-shaped, straight down, crossed-shaped, etc. Part attributes may be used to produce a relatively simple and relatively accurate representation of the shape of each part within a respective area, e.g., within a bounding box determined for each part using the 3D point cloud input.

20 Claims, 5 Drawing Sheets

(51) Int. Cl.
  *G06T 7/62* (2017.01)
  *G06T 19/00* (2011.01)
  *G06T 19/20* (2011.01)

(52) U.S. Cl.
  CPC ............ *G06T 19/006* (2013.01); *G06T 19/20* (2013.01); *G06T 2207/10028* (2013.01); *G06T 2210/12* (2013.01)

(56) References Cited

OTHER PUBLICATIONS

Shaoshuai Shi, Xiaogang Wang, Hongsheng Li, "PointRCNN: 3D Object Proposal Generation and Detection From Point Cloud", 2019, pp. 770-779 (Year: 2019).*

Alexiou, Evangelos; Ebrahimi, Touradj; "Exploiting user interactivity in quality assessment of point cloud imaging"; 2019 Eleventh International Conference on Quality of Multimedia Experience (QoMEX); pp. 1-6.

* cited by examiner

3D REPRESENTATION OF PHYSICAL ENVIRONMENT OBJECTS

CROSS-REFERENCE TO RELATED APPLICATIONS

This application claims the benefit of U.S. Provisional Application Ser. No. 63/318,861 filed Mar. 11, 2022, which is incorporated herein in its entirety.

TECHNICAL FIELD

The present disclosure generally relates to electronic devices that use sensor data to generate 3D representations of objects within physical environments, including generating such representations for use in providing views of extended reality (XR) environments and during communication sessions.

BACKGROUND

Various techniques are used to generate 3D representations of objects in physical environments. For example, a point cloud or 3D mesh may be generated to represent one or more of the objects in a room. Existing techniques may not adequately facilitate capturing and/or using 3D representations of such objects.

SUMMARY

Various implementations disclosed herein include devices, systems, and methods that provide three-dimensional (3D) representations of objects. Such representations may be based on 3D point cloud and/or two-dimensional (2D) image inputs that are obtained based on sensor data, e.g., images, depth data, motion data, etc. In some implementations a combination of 3D point cloud and 2D image input is used to enable the efficient generation of a relatively simple 3D representation of an object, for example, enabling the efficient representation of object position and size and of the general shape of the various parts of an object. 3D point cloud input may be used for part segmentation and/or to determine position and/or orientation of such parts, e.g., generating 3D bounding boxes representing the sizes, positions, and orientations, of object parts. 2D image input may be used for part attribute recognition, e.g., to determine whether a chair legs part has a particular type such as star-shaped, straight down, crossed-shaped, etc. Part attributes may be used to produce a relatively simple and relatively accurate representation of the shape of each part within a respective area, e.g., within a bounding box determined for each part using the 3D point cloud input. The output 3D representation of the object may thus be produced relatively efficiently (e.g., without requiring computationally expensive 3D meshing algorithms). The output 3D representation may provide a 3D representation with a reasonable level of accuracy with respect to the object's size, position, orientation, and part shapes. The output 3D representation may include a smoother, cleaner, or otherwise more desirable appearance that represents the parts of objects based on their known geometric shapes rather than based directly (or solely) on potentially noisy sensor data. The 3D representations may be used for various purposes including, but not limited to, generating object representations that can be used in real-time and during live communication sessions, placing virtual objects in XR (e.g., accurately positioning a virtual character's arm resting on the back of a sofa), and/or augmenting a search (e.g., searching for a couch similar to another person's couch).

In some implementations, a processor performs a method by executing instructions stored on a computer readable medium. The method obtains a 3D point cloud representing a physical environment and a 2D image representing the physical environment. The physical environment has an object having multiple parts. For example, the physical environment may be a room that has a chair that has seat, back, arms, and legs parts. The point cloud may be generated based on image and depth data and/or may be semantically labelled.

The method generates a first 3D representation of the object based on the 3D point cloud. The first 3D representation includes a first set of representations representing 3D positions and sizes of the multiple parts of the object. In some implementations, the first representation is a coarse representation that uses individual cubes, cylinders, or geometric primitives to represent the position/orientation of each part, e.g., a box representing the chair back, a box representing the chair seat, a box representing the chair legs, etc.

The method identifies attributes of the multiple parts of the object based on the 2D images. For example, one or more images of a chair object may be used to identify chair leg type, color, material, etc. Attribute recognition may additionally involve the use of other information about the object such as, but not limited to, object type information (e.g., identifying that the object is a chair, a sofa, a table, a ball, etc.) and/or an associated parts lists, e.g., identifying that a chair type object may, but does not necessarily, have seat, back, arms, and legs parts.

The method generates a second 3D representation of the object based on the first 3D representation and the attributes. The second 3D representation may be a refined representation relative to the first representation. The second 3D representation may include a second set of representations representing shapes of the multiple parts of the object that are positioned and sized based on the first set of representations. For example, this may involve positioning and sizing a cross-shaped chair leg representation in place of a corresponding bounding box of the first 3D representation to more accurately represent the chair legs.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
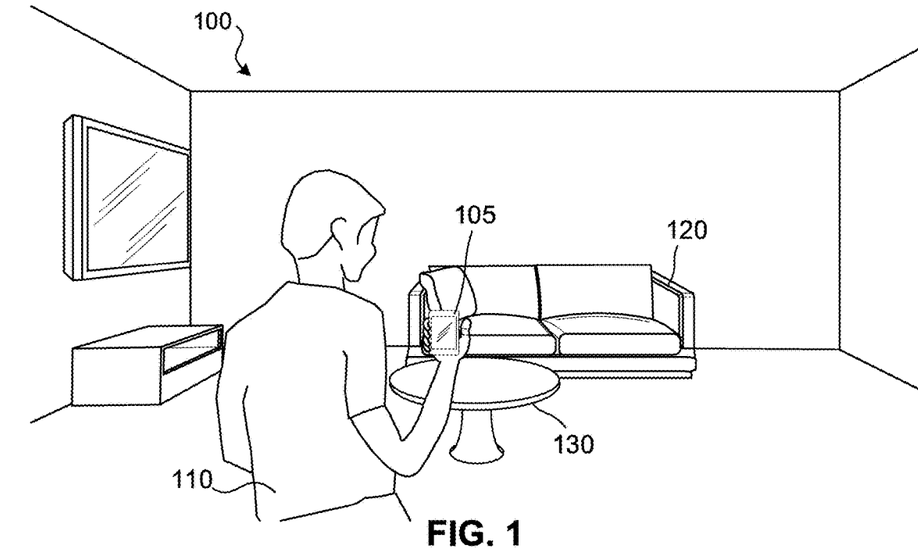
FIG. 1 illustrates an exemplary electronic device operating in a physical environment in accordance with some implementations.

FIG. 1 illustrates an exemplary electronic device 105 operating in a physical environment 100. In this example, the physical environment 100 is a room that includes several objects such as object 120 which is a couch and object 130 which is a table. The electronic device 105 includes one or more cameras, microphones, depth sensors, or other sensors that can be used to capture information about and evaluate the physical environment 100 and the objects within it, as well as information about the user 110 of the electronic device 105. The information about the physical environment 100 and/or user 110 may be used to provide visual and audio content, for example, during an extended reality (XR) experience or during a communication session involving one or more other devices. For example, a communication session may provide views to one or more participants (e.g., user 110 and/or other participants not shown) of a 3D environment that are generated based on camera images and/or depth sensor images of the physical environment 100 as well as representations of user 110 based on camera images and/or depth sensor images of the user 110.

Figure 2:
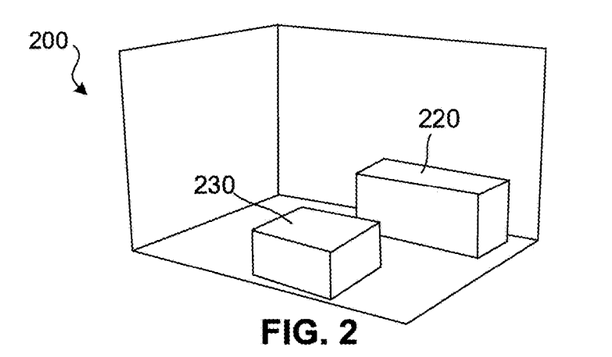
FIG. 2 illustrates a depiction of a coarse 3D representation of exemplary objects of the physical environment of FIG. 1 in accordance with some implementations.

FIG. 2 illustrates a depiction 200 of the physical environment 100 of FIG. 1, including 3D representations 220, 230 of exemplary objects 120, 130. In this example, the 3D representation 220 is a bounding area representing a 3D area within a 3D coordinate space corresponding the physical environment 100. By representing a bounded area of 3D space in which the object 120 is located in the physical environment 100, the 3D representation 220 represents the location and orientation of the object 120 in that space. Moreover, the 3D representation 220 is sized to correspond to outer portions of the object 120 and thus further represents the size of the object 120 (e.g., the size of its outermost portions and features). In this example, the 3D representation 230 is a bounding area representing a 3D area within the 3D coordinate space corresponding to the physical environment 100. The 3D representation 230 represents the location, orientation, and size of the object 130 in that space. In this example, the 3D representations 220, 230 are bounding boxes having six sides each. In other examples, spheres, cylinders, other 3D geometric primitives, or other 3D shapes having any number of sides are used to represent an approximate area in which an object is located. In some implementations, the type of bounding shape that is used (e.g., spherical, cylindrical, cubic, etc.) may be determined based on a general shape of an object, e.g., by matching a closest-fitting shape to an object's outer features. The 3D representations may have orientations that correspond to orientations of associated objects, e.g., a front side of 3D representation 220 may correspond to a front side of object 120.

Figure 5:
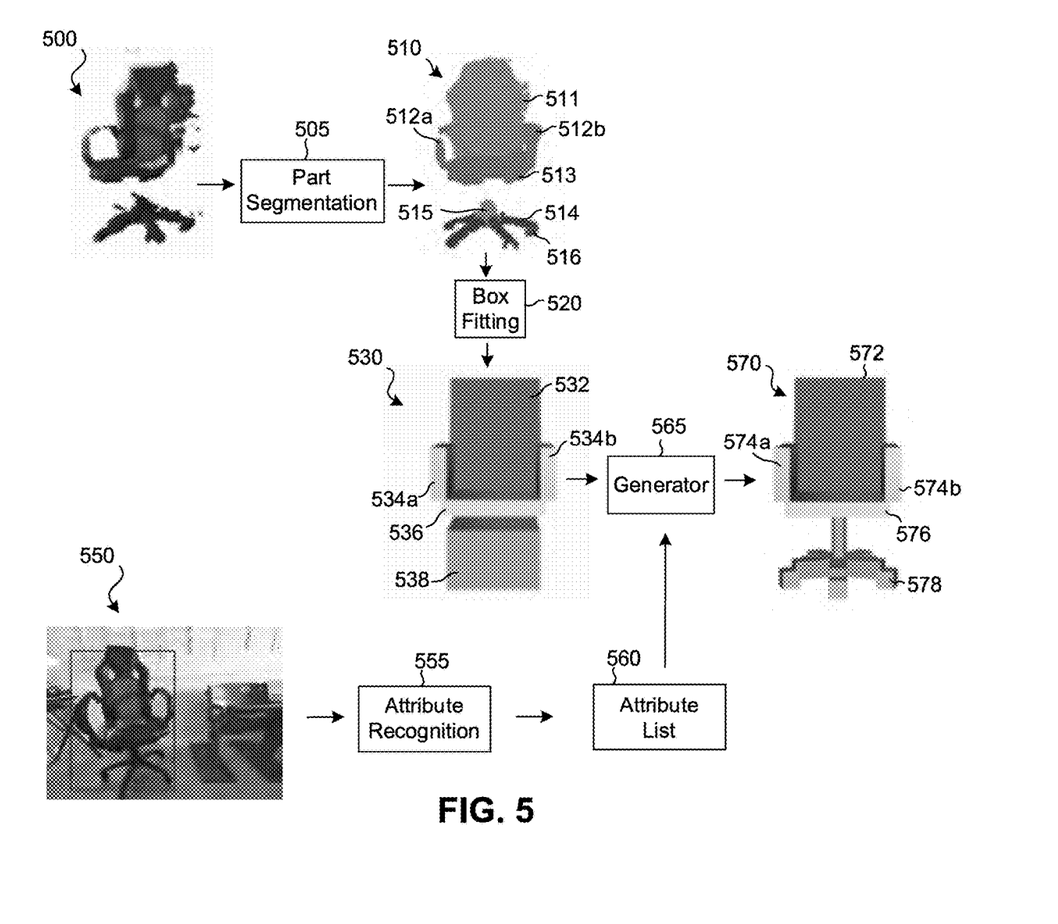
FIG. 5 illustrates an exemplary process for generating a 3D representation of an object in accordance with some implementations.

A 3D representation may be divided or segmented into one or more smaller bounding shapes, for example, bounding boxes corresponding to individual parts of each object. For example, 3D representation 230 may alternatively include two bounding boxes, one bounding box corresponding to an upper surface/table-top part and a second corresponding to a legs part of the object 130. The number of 3D bounding boxes may be based on a number of potential parts to be represented individually for an object type, e.g., a coffee table type object may have upper surface, shelf, and legs parts while a dining table type object may have upper surface and leg parts. Examples of bounding boxes corresponding to multiple parts of an object are illustrated in FIG. 5 and described below.

The 3D representations of objects and object portions may be determined based on various types of sensor data about the physical environment 100. In some implementations, such sensor data is used to generate a 3D representation of the entire environment that is separated to represent multiple objects or objects parts. For example, depth data and/or image data may be used to generate a 3D point cloud representing physical environment 100. Portions of such a point cloud corresponding to object 120 and/or its individual parts may be identified, semantically labelled, and used to generate the 3D representation 220 or its individual parts. For example, the outermost points of the point cloud corresponding to the object 120 may be used to determine the orientation of the 3D representation 220 and the positions of its outer sides, e.g., by finding a bounding box that encompasses all or at least a predetermined percentage (e.g., 99%, 99.9%, etc.) of the points representing object 130. In a similar manner, portions of such a 3D point cloud of the environment that correspond to object 130 and/or its individual parts may be identified, semantically labelled, and used to generate the 3D representation 230 or its individual parts.

Points of a 3D point cloud may be generated based on depth values measured by a depth sensor and thus may be sparser for objects farther from the sensor than for objects closer to the sensor. In some implementations, an initial 3D point cloud is generated based on sensor data point values and then an improvement process is performed to improve the 3D representation, e.g., by performing densification based on other sensor data and/or processing to add points to make the point cloud denser, etc.

As with an initial 3D point cloud used to generate the coarse 3D representation, the 3D representations 220, 230 may be refined to better represent the shape, appearance, or other attributes of the object 120, 130, respectively. For example, the 3D representations 220, 230 may be changed from bounding boxes to other, more object-type specific shapes in the same locations, orientations, and sizes. The refinements to the 3D representations may be based on image data or other data separate from the 3D point cloud data used to generate the initial coarse representations. Use of other data may enable more efficient and/or accurate results.

Figure 3:
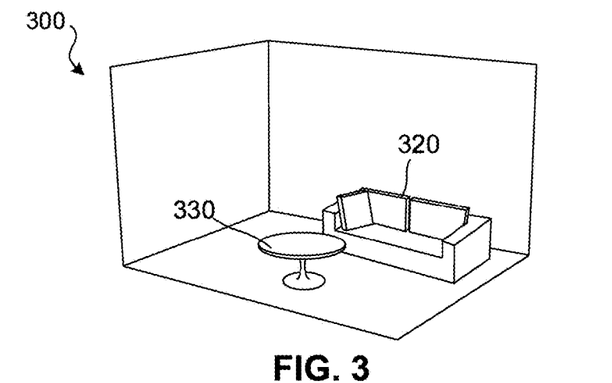
FIG. 3 illustrates a depiction of a refined 3D representation of the exemplary objects of FIG. 1 in accordance with some implementations.

FIG. 3 illustrates a depiction of an environment 300 that includes refined 3D representations 320, 330 of the exemplary objects 120, 130 of FIG. 1. In this example, the 3D representation 320 is selected based on image data of the physical environment 100. The image data is used to select a 3D representation that best approximates attributes (e.g., shape) of the object 120, e.g., best amongst a set of available 3D representation options. The selected 3D representation 320 is positioned in the coordinate space corresponding to the physical environment 100 based on the location, orientation, and size of the corresponding 3D representation 220 of FIG. 2. Similarly, the 3D representation 330 is selected based on image data of the physical environment 100. The image data is used to select a 3D representation that best approximates attributes (e.g., shape) of the object 130, e.g., best amongst a set of available 3D representation options. The 3D representation 330 is positioned in the coordinate space corresponding to the physical environment 100 based on the location, orientation, and size of the corresponding 3D representation 230 of FIG. 2. The environment 300 thus includes 3D representations 320, 330 that are efficiently generated to represent object 120, 130 with a reasonable level of accuracy with respect to 3D size, position, orientation, and shape. The 3D representations 320, 330 may include a smooth, clean, or otherwise desirable appearance that represents the objects based on known geometric shapes of objects of the same type and general shape rather than based directly on potentially noisy sensor data.

The accuracy and/or level of detail of 3D representations of an object may be improved in some implementations by treating the parts of the object individually, e.g., representing the table's surface as one part and the table's legs as another part. Examples of using multiple 3D representations corresponding to multiple parts of an object are illustrated in FIG. 5 and described below.

Figure 4:
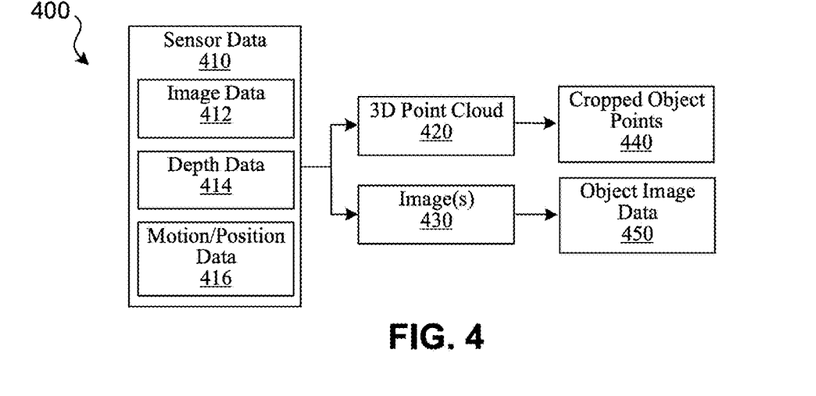
FIG. 4 illustrates an exemplary process for generating object points and images based on sensor data in accordance with some implementations.

FIG. 4 illustrates an exemplary process 400 for generating object points and images based on sensor data. Such data may be used as input to generate 3D representations of objects using the techniques disclosed herein. In this example of FIG. 4, sensor data 410 is obtained regarding a physical environment such as physical environment 100 of FIG. 1. For example, sensors on a device such as device 105 may instantaneously, continuously, or periodically capture information about the physical environment as a user moves with the device with the physical environment. The device, for example, may be moved around the physical environment to capture of sensor data 410 from different positions, e.g., viewing different sides of the object as the user walks around the object. In the example of FIG. 4, the sensor data 410 includes image data 412 captured by an image sensor (e.g., an RGB camera or video camera), depth data 414 captured by a LIDAR or other depth sensor, and motion/position data 416 captured by a motion sensor such as an accelerometer or gyroscope. In some implementations, the image sensor includes a 2D image sensor configured to capture 2D images and/or RGB-D image sensor configured to capture 2D images and corresponding depth information. The sensor data 410 is interpreted or otherwise processed to produce a 3D point cloud 420 (e.g., of the entire room) and images 430 (e.g., of the room from one or more viewpoints). In some implementations, the images 430 are 2D RGB images.

The 3D point cloud 420 is then analyzed or otherwise processed to identify points corresponding to particular objects and/or object parts. For example, the 3D point cloud may be semantically analyzed to provide a semantic label to each point identifying an object type or object part type to which the point is associated. Such semantic data may be used to select a set of points corresponding to a single object or a single object part, e.g., by selecting points having a common semantic label within a region or threshold distance of one another. The cropped object points 440 corresponding to a single object or object part are output for further use in generating 3D object representations.

The image(s) 430 are analyzed or otherwise processed to identify portions of the image corresponding to particular object and/or object part. The pixels of the images, for example, may be semantically analyzed to provide a semantic label to each pixel identifying an object type or object part type to which the pixel is associated. Such semantic data may be used to identify 2D areas of each of the one or more images 430 corresponding to the same object or object part, e.g., by selecting areas of each image in which the object is depicted. This object image data 450 is output for further use in generating 3D object representations.

FIG. 5 illustrates a process for generating a 3D representation of an object. In this example, the process is input cropped object points 500 (e.g., cropped object points 440 of FIG. 4) and object image data 550 (e.g., object image data 450 of FIG. 4). A part segmentation process 505 analyzes or otherwise processes the cropped object points 500 to identify sets of points 510 corresponding to different parts of the object. In this example, the sets of points 510 include points 511 corresponding to a chair back part, points 512a corresponding to a first arm part, points 512b corresponding to a second arm part, points 513 corresponding to a seat part, and points 514, 515, 516 collectively corresponding to a legs part.

The sets of points 510 are input to a box fitting process 520 that generates coarse 3D representation 530 that includes 3D bounding boxes corresponding to each of these parts. In this example, the bounding box 532 corresponds to the chair back part based on points 511, bounding box 534a corresponds to the first arm part based on points 512a, bounding box 534b corresponds to the second arm part based on the points 534b, bounding box 536 corresponds to the seat part based on points 513, and bounding box 538 corresponds to the legs part based on points 514, 515, 516 collectively.

The object image data 550 is input to an attribute recognition process 555 that analyzes or otherwise processes the one or more images to identify an attribute list 560 of object and/or part attributes, e.g., identifying the type of object, the number of parts the object has, the type of each part of the object, a shape description of each part, a texture description of each part, a material description of each part, etc. For example, the attribute recognition process 555 may analyze object image data 550 to identify an object and determine an attribute list 560 based on determining that an object type is "chair", the object has five parts, a type of each part (e.g., one back part, one seat part, on base/legs part, and two arm parts), shape descriptions of each part (e.g., the base/legs part has star shape), a texture and/or material description of each part (e.g., the base part has a texture/appearance and/or material characteristics that can be represented by a pixel pattern or other pixel set, material type (e.g., leather, cloth, cotton, wood, etc.), a set of one or more colors of each part, and/or appearance characteristic (e.g., shiny, matte, etc.), etc.).

The coarse 3D representation 530 and the attribute list 560 are input to generator 565, which is configured to produce a refined 3D representation 570. The generator 570 may determine specific 3D part representations corresponding to each part of the object based on the attribute list 560 and position these 3D part representations based on the corresponding positions and/or orientations of the bounding boxes of the coarse 3D representation 530. In this example, representation 572 is selected and positioned in place of bounding box 532, representation 574*a* is selected and positioned in place of bounding box 534*a*, representation 574*b* is selected and positioned in place of bounding box 534*b*, and representation 578 is selected and positioned in place of bounding box 538.

In this example, the attribute list 560 is used in refining bounding box 538 into representation 578. For example, the attribute list 560 could include a leg pattern attribute that identifies a five-point start leg pattern. This may have been identified from image data 550. The image data 550 may also be used to determined that the five-point leg patter attribute corresponds to bounding box 538 (e.g., to the part within that bounding box 538). Then, the leg pattern attribute can be used to refine bounding box 538 and generate a corresponding simplified five-point star leg pattern as shown by representation 578. The simplified five-point star leg pattern may be generated on-the-fly or recalled from memory (e.g., from a database). The bounding box size may provide the size/dimensions of the part and the attributes may provide the shape and/or other appearance characteristics of the part.

The refined 3D representation 570 may include a smooth, clean, or otherwise desirable appearance that represents the object and its parts based on known geometric shapes of objects of the same type and general shape rather than based directly on potentially noisy sensor data.

Figure 6:
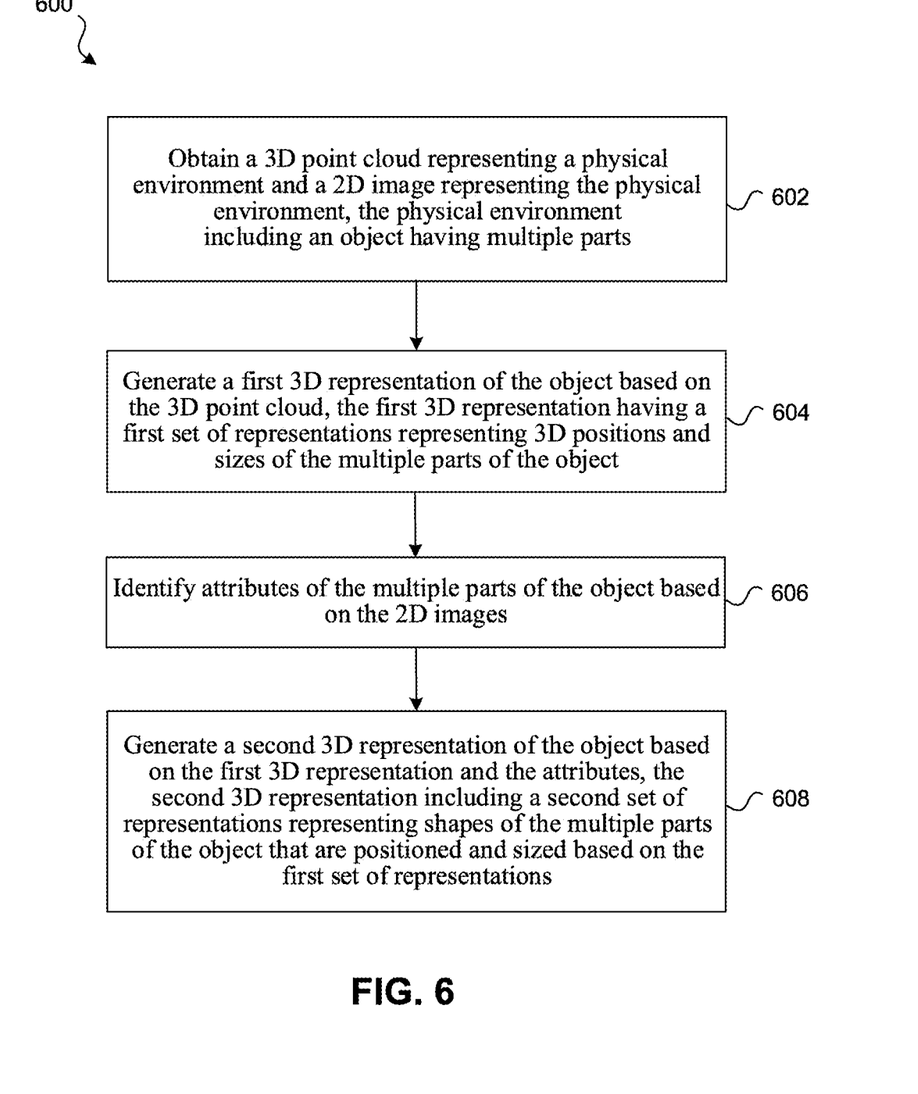
FIG. 6 is a flowchart illustrating a method for generating a 3D representation of an object in accordance with some implementations.

FIG. 6 is a flowchart illustrating a method 600 for generating a 3D representation of an object. In some implementations, a device such as electronic device 105 performs method 600. In some implementations, method 600 is performed on a mobile device, desktop, laptop, head-mounted device (HMD), ear-mounted device or server device. The method 600 is performed by processing logic, including hardware, firmware, software, or a combination thereof. In some implementations, the method 600 is performed on a processor executing code stored in a non-transitory computer-readable medium (e.g., a memory).

At block 602, the method 600 obtains a 3D point cloud representing a physical environment and a 2D image representing the physical environment. The physical environment has an object having multiple parts. For example, the physical environment may an outdoor park having a picnic table and a firepit or a room that has a chair that has seat, back, arms, and legs parts. The point cloud may be generated based on image data, depth data, and/or any other sensor data or other data about the physical environment. The point cloud may be semantically labelled, for example, using a machine learning model such as an artificial neural network trained to label point cloud pixels with labels corresponding to object type, object part type, or other descriptions.

At block 604, the method 600 generates a first 3D representation of the object based on the 3D point cloud, the first 3D representation having a first set of representations representing 3D positions and sizes of the multiple parts of the object. The first 3D representation may be a coarse representation and/or may use a single geometric primitive to represent the position and orientation of each part, e.g., a box representing the chair back, a box representing the chair legs, etc. The scale of the first 3D representation may generally correspond to scale of the object. Similarly, the individual bounding boxes may be size based on the actual sizes of the parts that they correspond to and thus accurately represent the scale/sizes of the parts of the object relative to one another and to elements of the surrounding environment. The bounding areas may be cubes, cylinders, or other 3D geometric primitives or shapes defining 3D areas in which points of the point cloud that are associated with common semantic labels are located. The 3D point cloud may have points associated with semantic labels and the 3D representation may be generated based on the semantic labels of the points. A part segmentation process used to identify individual parts of multiple parts of the object may use the semantic labels of the points to identify such parts.

At block 606, the method 600 identifies attributes of the multiple parts of the object based on the 2D images. For example, based on analyzing a portion of an image, the method 600 may determine that the chair leg part depicted in the image has a particular type, shape, color, material, texture, etc. In some implementations, a given object has an associated parts list that is used to identify part-specific attributes for an object. In some implementations, semantic labels (e.g., of pixels and/or corresponding 3D point cloud points) are used to identify attributes of the multiple parts.

At block 608, the method 600 generates a second 3D representation of the object based on the first 3D representation and the attributes. The second 3D representation includes a second set of representations representing shapes of the multiple parts of the object that are positioned and sized based on the first set of representations. Identified attributes of the object may be used to refine the first 3D representation to generate a second 3D representation that has more detail, greater accuracy, depicts sub-parts, depicts materials, depicts shapes and contours, or that otherwise better represents the object than the first 3D representation. For example, based on determining that the chair legs part has a "crossed" type, an appropriate crossed type chair leg representation may be selected or generated and positioned in place of a bounding box to more accurately represent the shape of the chair legs than the bounding box. Accordingly, in some implementations, the first set of representations represents 3D positions and sizes of bounding areas of the multiple parts of the object and the second set of representations are positioned within the bounding areas of the multiple parts of the object.

The second 3D representation may include a smoother, cleaner, or otherwise more accurate or otherwise desirable appearance that represents the parts of objects based on known the known geometric shapes of the parts rather than based directly on potentially noisy sensor data. The 3D representations may be used for various purposes including, but not limited to, generating object representations that can be used in real-time and during live communication sessions, placing virtual objects in XR (e.g., accurately positioning a virtual character's arm resting on the back of a sofa), and/or augmenting a search (e.g., searching for a couch similar to another person's couch).

In contrast to a physical environment that people can sense and/or interact without aid of electronic devices, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 7:
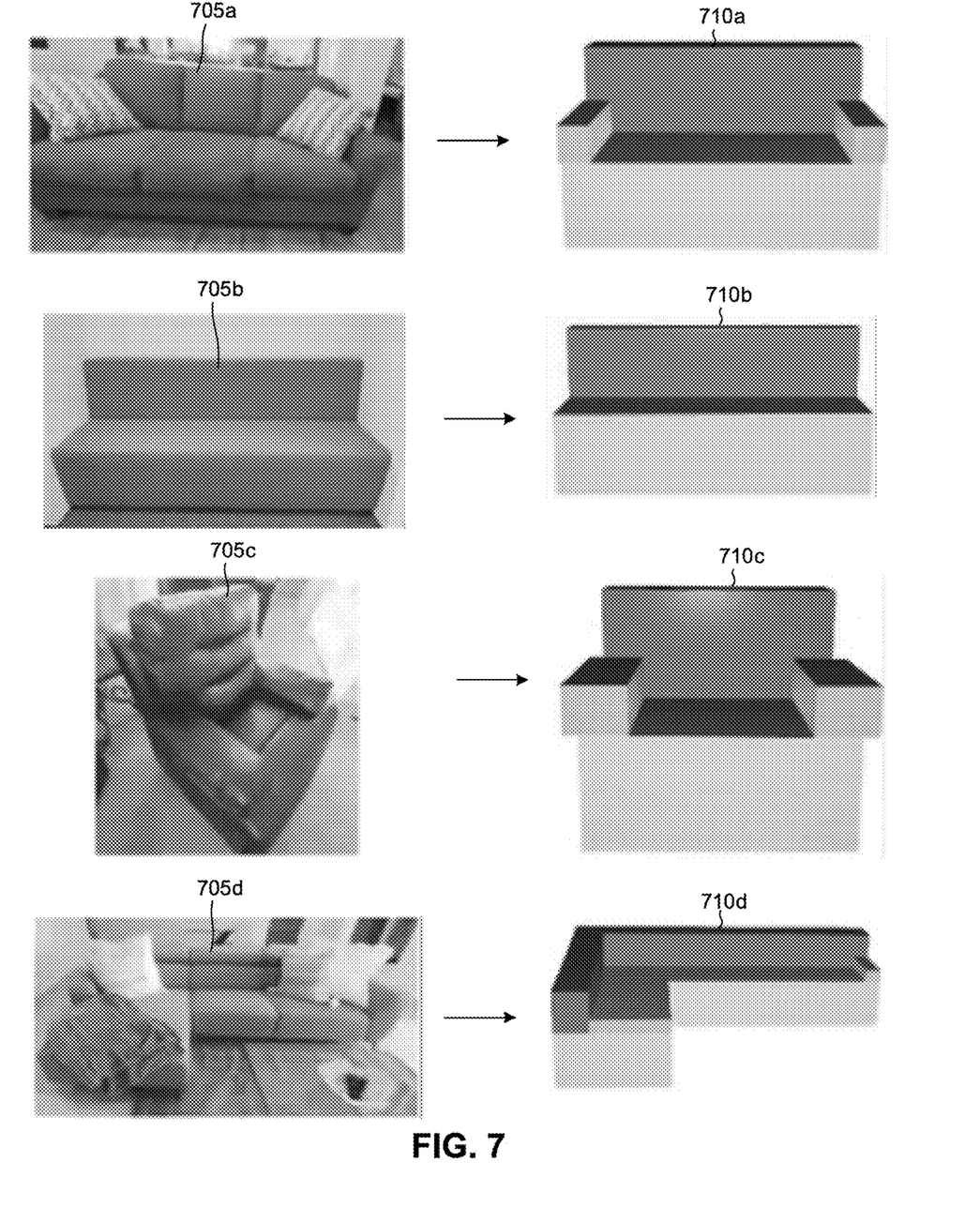
FIG. 7 illustrates examples of 3D representations of exemplary objects.

FIG. 7 illustrates examples 3D representations of exemplary objects. In this example, 3D representation 710*a* represents the object 705*a*, 3D representation 710*b* represents the object 705*b*, 3D representation 710*c* represents the object 705*c*, and 3D representation 710*d* represents the object 705*d*.

Figure 8:
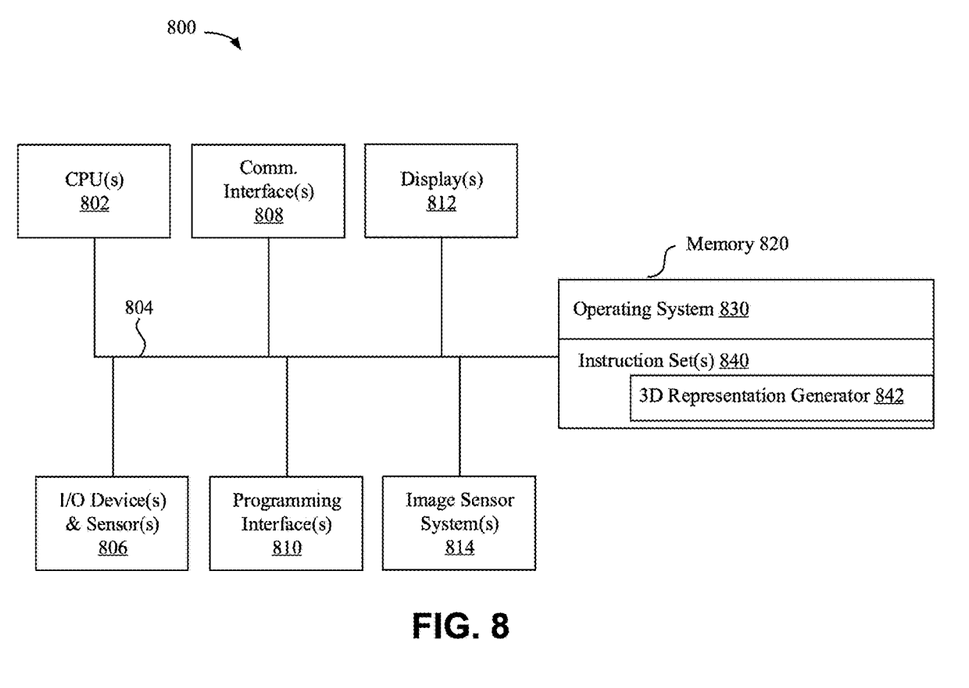
FIG. 8 is a block diagram of an electronic device of in accordance with some implementations.

FIG. 8 is a block diagram of electronic device 800. Device 800 illustrates an exemplary device configuration for electronic device 105. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 810, one or more output device(s) 812, one or more interior and/or exterior facing image sensor systems 814, a memory 820, and one or more communication buses 1004 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 812 include one or more displays configured to present a view of a 3D environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 800 includes a single display. In another example, the device 800 includes a display for each eye of the user.

In some implementations, the one or more output device(s) 812 include one or more audio producing devices. In some implementations, the one or more output device(s) 812 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s)

in the 3D environment (e.g., from one or more particular sound sources) even though the actual sounds may be produced by speakers in other locations. The one or more output device(s) 812 may additionally or alternatively be configured to generate haptics.

In some implementations, the one or more image sensor systems 814 are configured to obtain image data that corresponds to at least a portion of a physical environment. For example, the one or more image sensor systems 814 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include 3D representation generator instruction set 842 configured to, upon execution, generate representations of objects in a physical environment, for example, during an XR experience or communication session, as described herein.

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   obtaining a three-dimensional (3D) point cloud representing a physical environment and a two-dimensional (2D) image representing the physical environment, the physical environment comprising an object having multiple parts;
   generating a first 3D representation of the object based on the 3D point cloud, the first 3D representation comprising a first set of representations specifying 3D positions and sizes of the multiple parts of the object;

identifying attributes of the multiple parts of the object based on the 2D image, the attributes comprising part-specific attributes; and generating a second 3D representation of the object based on the first 3D representation and the attributes, the second 3D representation comprising a second set of representations specifying shapes of the multiple parts of the object that are positioned and sized based on the first set of representations.

2. The method of claim 1, wherein:

the first set of representations represents 3D positions and sizes of bounding areas of the multiple parts of the object; and the second set of representations are positioned within the bounding areas of the multiple parts of the object.

3. The method of claim 2, wherein the bounding areas are cubes, cylinders, or 3D geometric primitives defining 3D areas in which points of the point cloud that are associated with common semantic labels are located.

4. The method of claim 1, wherein the 3D point cloud comprises points associated with semantic labels, wherein the first 3D representation is generated based on the semantic labels of the points.

5. The method of claim 4, wherein generating the first 3D representation comprises performing a part segmentation using the semantic labels of the points.

6. The method of claim 4, wherein identifying the attributes of the multiple parts is based on the semantic labels.

7. The method of claim 4, wherein identifying the attributes of the multiple parts is based on a parts list.

8. The method of claim 1, wherein the 3D point cloud is generated based on depth data from a depth sensor.

9. The method of claim 1, wherein the first set of representations further specifies 3D orientations of the multiple parts of the object.

10. The method of claim 1, wherein the attributes of the multiple parts correspond to part type, shape, color, texture, or material.

11. The method of claim 1 further comprising positioning a virtual object in an extended reality (XR) environment based on the second 3D representation.

12. The method of claim 1 further comprising performing a search for 3D content based on the second 3D representation.

13. A first device comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

obtaining a three-dimensional (3D) point cloud representing a physical environment and a two-dimensional (2D) image representing the physical environment, the physical environment comprising an object having multiple parts;

generating a first 3D representation of the object based on the 3D point cloud, the first 3D representation comprising a first set of representations specifying 3D positions and sizes of the multiple parts of the object;

identifying attributes of the multiple parts of the object based on the 2D image, the attributes comprising part-specific attributes; and generating a second 3D representation of the object based on the first 3D representation and the attributes, the second 3D representation comprising a second set of representations specifying shapes of the multiple parts of the object that are positioned and sized based on the first set of representations.

14. The system of claim 13, wherein:

the first set of representations represents 3D positions and sizes of bounding areas of the multiple parts of the object; and the second set of representations are positioned within the bounding areas of the multiple parts of the object.

15. The system of claim 14, wherein the bounding areas are cubes, cylinders, or 3D geometric primitives defining 3D areas in which points of the point cloud that are associated with common semantic labels are located.

16. The system of claim 13, wherein the 3D point cloud comprises points associated with semantic labels, wherein the first 3D representation is generated based on the semantic labels of the points.

17. The system of claim 16, wherein generating the first 3D representation comprises performing a part segmentation using the semantic labels of the points.

18. The system of claim 16, wherein identifying the attributes of the multiple parts is based on the semantic labels.

19. The system of claim 16, wherein identifying the attributes of the multiple parts is based on a parts list.

20. A non-transitory computer-readable storage medium storing program instructions executable via one or more processors to perform operations comprising:

obtaining a three-dimensional (3D) point cloud representing a physical environment and a two-dimensional (2D) image representing the physical environment, the physical environment comprising an object having multiple parts;

generating a first 3D representation of the object based on the 3D point cloud, the first 3D representation comprising a first set of representations specifying 3D positions and sizes of the multiple parts of the object;

identifying attributes of the multiple parts of the object based on the 2D image, the attributes comprising part-specific attributes; and generating a second 3D representation of the object based on the first 3D representation and the attributes, the second 3D representation comprising a second set of representations specifying shapes of the multiple parts of the object that are positioned and sized based on the first set of representations.

* * * * *